United States Patent Office 3,179,707
Patented Apr. 20, 1965

3,179,707
DEHYDROGENATION OF ETHYLBENZENE
Emerson H. Lee, Texas City, Tex., assignor to Monsanto Company, a corporation of Delaware
No Drawing. Filed Mar. 21, 1962, Ser. No. 181,472
5 Claims. (Cl. 260—669)

This invention relates to an improved process for the catalytic dehydrogenation of alkylated aromatic hydrocarbons. More particularly, it pertains to a process for the dehydrogenation of ethylbenzene whereby yields to styrene are increased by the addition of chlorides or fluorides.

In view of its utility in the production of plastics, styrene has achieved considerable industrial prominence in which it may be polymerized with various co-monomers to produce a variety of snythetic polymers and to yield resins which are suitable for manufacturing various articles of commerce by casting, compressing, molding and the like, besides being used with other polymerizable materials. Styrene may also be homopolymerized to produce polystyrene, one of the most widely used synthetic resins.

The process of manufacturing styrene by rapidly passing ethylbenzene and steam at high temperatures over a suitable catalyst bed is common knowledge in the trade. For example, the usual method is to mix superheated steam and vaporized ethylbenzene in the correct proportions, the resultant temperature being the reaction temperature, and then pass the mixture through the catalytic reactor where dehydrogenation of ethylbenzene to styrene occurs.

The catalysts used in the process usually contain as a primary active constituent, metals of Groups IV to VIII of the Periodic Tables preferably in the form of various other compounds such as oxides, sulfides, phosphates and the like. Generally, mixtures of two or more of such compounds are employed. Some of these catalysts are charactertized by certain disadvantages such as low conversion and selectivity, poor physical strength, short catalysts life and necessity for frequent regeneration. Typical catalysts that have been found to have a minimum of these disadvantages are catalysts containing iron oxide and small amounts of another metal oxide as a stabilizer and a small amount of an alkali-metal compound as a promoter. These compounds are autoregenerative under conditions at which the dehydrogenation is carried out, that is, they are capable of being regenerated as a catalyst. While these catalysts are generally suitable and widely used because of the above-mentioned advantages, maximum activity and maximum selectivity has not been achieved to the level believed possible. Research is constantly being continued to discover means by which activity and selectivity can be improved.

It is well known that in the thermal dehydrogenation of ethylbenzene to styrene, certain materials when present during the reaction act chemically by combining with the hydrogen set free from the ethylbenzene to form substances which are stable under reaction conditions and thus prevent reversal of the reaction. Some compounds not only act chemically but they also release or form a gas which further assists the process by reducing the pressure of ethylbenzene. By the use of such compounds, the thermal cracking process may be favorably affected by increasing the productivity, efficiency and concentration of styrene. Among substances which have been found to act either chemically or physically are benzene, carbon disulphide, carbon tetrachloride and sulfur. Others which are known to act both chemically and physically are ethylene chloride, sulphur monochloride, sulphur dichloride and sulphur dioxide.

The object, therefore, of this invention is to provide a process whereby the yield of styrene in the catalytic dehydrogenation of ethylbenzene is increased. A further object of the invention is to provide a process whereby the selectivity of the catalyst in the dehydrogenation of alkylated aromatic hydrocarbons is improved. These and other objects of the invention will become apparent from the following description.

According to the present invention, an alkylated aromatic hydrocarbon is dehydrogenated to the corresponding vinyl-substituted aromatic hydrocarbon in the presence of added steam and small amounts of chlorides or fluorides at elevated temperatures by contacting the alkylated aromatic hydrocarbon with an alkali-metal-promoted dehydrogenation catalyst.

The following examples will illustrate the invention but are not to be construed as limiting it in any manner whatsoever.

Example I

Vaporized ethylbenzene and two pounds of steam per pound of ethylbenzene were passed over an iron oxide dehydrogenation catalyst containing approximately 90% by weight of iron oxide, 5% by weight potassium oxide and 3% by weight chromium oxide and known to the trade as "Shell 105" at approximately 590° C. The feed stream contained 200 p.p.m. of ethylene dichloride. The reactor consisted of a stainless steel tube approximately 1½ inches in diameter heated by means of a tube furnace. The catalyst was disposed in a fixed bed inside the reactor to a height of 32 inches. The feed materials were passed over the catalyst at a rate of approximately 120 grams per hour, a pressure of one atmosphere and for a period of approximately 360 hours. The average conversion of ethylbenzene to styrene during this period was 55.4%. The average selectivity of the catalyst for styrene over the entire run was 86.4%.

Example II

A feed stream consisting of vaporized ethylbenzene and two pounds of steam per pound of ethylbenzene together with 400 p.p.m. of ethylene dichloride were passed over 32 inches of a catalyst identical to that described in Example I in the reactor of Example I for a period of 168 hours at an average temperature of 590° C. The feed rate was approximately 120 grams per hour and the pressure was maintained at one atmosphere. The average conversion of ethylbenzene to styrene during the run was 57.6% and the average selectivity of the catalyst for styrene was calculated to be 87.5%.

Example III

A feed stream of vaporized ethylbenzene and two pounds of steam per pound of ethylbenzene together of 1,000 p.p.m. of ethylene dichloride were fed through a stainless steel reactor identical to that of Example I over 32 inches of "Shell 105" iron oxide catalyst for a 96-hour period. The ethylbenzene feed rate was approximately 120 grams per hour at a pressure of one atmosphere and a temperature of approximately 590° C. to 595° C. In this run, as well as in the ones above, the effluent gas passed from the reactor into a water-cooled condenser and the condensate was collected in a receiving flask. Noncondensible gas was passed through a wet test meter and vented after measurement. The average conversion of ethylbenzene to styrene for this run was calculated to be 53.0%. The catalyst selectivity to styrene was calculated to be 88.5%.

Example IV

The vaporized ethylbenzene and styrene in a weight ratio of two pounds of steam per pound of ethylbenzene were passed over an amount of catalyst identical to that in the above examples in the reactor of Example I. No ethylene dichloride or other chloride compounds were introduced with the feed material. The average conversion of ethylbenzene to styrene was calculated to be 56.0%. The average selectively of the catalyst for styrene was calculated to be 85.0%. The feed rate was approximately 120 grams per hour at a pressure of one atmosphere and a temperature of approximately 590° C.

It is apparent from the examples above that the addition of small amounts of a chloride compound with the ethylbenzene feed to the catalytic reactor will result in improved selectivity of the catalyst and as good or very slightly decreased conversion of ethylbenzene to styrene. In view of the prior art which recites chlorides as being poisonous for dehydrogenation catalysts, it is particularly unexpected that increases in catalyst selectivity, using an alkali-promoted dehydrogenation catalyst, are obtained. In particular, one skilled in the art would not expect to achieve nearly as high a conversion as has been demonstrated in the improved process of the present invention.

Reactor size has no bearing on the operation of the invention but is presumed that the optimum size to give the proper residence time, as is usual in this type of dehydrogenation reaction, will be used. Reactor configuration is likewise unimportant. This process can be practiced in fixed bed reactor, tubular reactor or fluidized bed reactor with equal success.

In carrying out this process, conditions may be widely varied. The dehydrogenation reaction may be carried out at any temperature in the range from about 500° C. to about 800° C. and at any desired pressure from about one p.s.i.a. to about 30 p.s.i.a. It is advantageous to maintain the pressure as low as possible but ordinarily atmospheric pressure is employed. The preferred temperature range is generally from about 550° C. to about 700° C. The steam diluent is utilized in any amount from one to about 30 moles of steam per mole of ethylbenzene charged.

The composition of the dehydrogenation catalyst to which the invention is applicable may vary considerably. Any alkali-metal-promoted iron oxide, promoted magnesium oxide or promoted copper chromite catalyst or any other transition metal oxide, especially oxides of titanium, vanadium, chromium, manganese, cobalt, nickel and zinc, may be used without departing from the scope of this invention. The amount of alkali-metal promoter generally employed in the catalyst is from about 3% by weight to about 30% by weight. Generally, the iron oxide, magnesium oxide, or other major constituents of the catalyst is present in amounts from about 65% to about 95% by weight. Ordinarily a heavy metal oxide, more diifficultly reducible than iron oxide or copper chromite, is used in an amount from about 0.5% to about 5.0% by weight to stabilize the iron oxide or copper chromite although this component is not absolutely necessary for preparing active catalysts. The following may be used as stabilizers if desired: oxides of metals of the right side of Groups I, II and III of the Periodic System, particularly oxides of silver, zinc, and cadmium; non-acidic transition oxides of chromium, manganese, cobalt and nickel; and non-acidic oxides of thorium, zirconium, cerium, lead, bismuth and aluminum.

The concentration of chloride or fluoride in the feed stream to the catalytic bed can be varied also over a wide range. Any concentration from about 5 p.p.m. to about 5,000 p.p.m., either pulsed or continuously, is effective to accomplish the above-described advantages of this process. However, quantities from about 50 p.p.m. to about 1,000 p.p.m. are preferred.

Other than the organic chloride compounds exemplified in the examples, any organic or inorganic chloride or fluoride carrier in which the halogen is reactive under dehydrogenation reaction conditions may be introduced with the ethylbenzene-stream feed to the reactor to yield the advantages of the process of this invention. For instance, organic compounds having from 2 to 12 carbon atoms such as α-chloroethylbenzene, trichloroethylene, and ethyl chloride may be substituted for the ethylene dichloride of Example I. Inorganic compounds which are effective in this process are hydrogen chloride, sodium chloride, and free chlorine. It is important, however, that stable compounds such as chlorobenzenes not be used since they are ineffective under dehydrogenation reaction conditions.

In addition to its utility in the dehydrogenation of ethylbenzene to styrene, the improved process of this invention is applicable for use in the dehydrogenation of various other aromatic hydrocarbons having an alkyl side chain of at least two carbon atoms and not more than 8 carbon atoms such as, for example, propylbenzene, diethylbenzene, ethyltoluene, propyltoluene, ethylnaphthalene, diethylnaphthalene, diethyl diphenyl, and the like. Likewise, the process of the invention is suitable for use in the production of diolefins by dehydrogenation of mono-olefins having at least four non-quarternary carbon atoms in a straight chain. They are particularly useful, for example, in the production of butadiene from butylene and are also applicable and advantageous for the production of other diolefins and particularly conjugated diolefins such as piperylene, isoprene, the various hexadienes, and the like from the corresponding mono-olefins.

What is claimed is:

1. In a process for the dehydrogenation of ethylbenzene to styrene at a temperature from about 500 to about 800° C. and a pressure from about 1 p.s.i.a. to about 30 p.s.i.a. in the presence of from about 1 to about 30 moles of steam per mole of ethylbenzene over a fixed bed alkali-metal-promoted dehydrogenation catalyst wherein the major constituent is chosen from the group consisting of iron oxide, copper chromate and magnesium oxide, the improvement which comprises adding small amounts of a halogen carrier chosen from the group consisting of chlorides and fluorides in which the halogen is reactive under dehydrogenation reaction conditions.

2. The process of claim 1 wherein the concentration of halogenated compound in the feed stream to the catalytic bed is in the range from about 5 p.p.m. to about 5,000 p.p.m.

3. The process of claim 2 wherein the halogenated compound is an organic compound having a reactive halogen under dehydrogenation reaction conditions and having from 2 to 10 carbon atoms.

4. The process of claim 2 wherein the halogenated compound is an inorganic compound having a reactive halogen under dehydrogenation reaction conditions and chosen from the group consisting of hydrogen chloride, sodium chloride, and free chlorine.

5. The process of claim 2 wherein the halogenated compound is a chlorinated aliphatic hydrocarbon.

References Cited by the Examiner

UNITED STATES PATENTS

| | | | |
|---|---|---|---|
| 1,938,827 | 12/33 | Gibbons et al. | 260—669 |
| 2,426,829 | 9/47 | Kearby | 260—669 |
| 2,443,217 | 6/48 | Amos et al. | 260—669 |

ALPHONSO D. SULLIVAN, *Primary Examiner.*